United States Patent
Buhmann

(10) Patent No.: US 9,804,579 B2
(45) Date of Patent: Oct. 31, 2017

(54) METHOD FOR OPERATING A ROTATION RATE SENSOR

(71) Applicant: Robert Bosch GmbH, Stuttgart (DE)

(72) Inventor: Alexander Buhmann, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 386 days.

(21) Appl. No.: 14/564,990

(22) Filed: Dec. 9, 2014

(65) Prior Publication Data
US 2015/0160632 A1    Jun. 11, 2015

(30) Foreign Application Priority Data
Dec. 10, 2013    (DE) .................. 10 2013 225 359

(51) Int. Cl.
*G05B 15/02*       (2006.01)
*G01C 19/5776*     (2012.01)

(52) U.S. Cl.
CPC ......... *G05B 15/02* (2013.01); *G01C 19/5776* (2013.01)

(58) Field of Classification Search
CPC ........................... G05B 15/02; G01C 19/5766
See application file for complete search history.

(56) References Cited

U.S. PATENT DOCUMENTS

| | | | | |
|---|---|---|---|---|
| 5,438,870 A * | 8/1995 | Zabler | ............... | G01C 19/5755 73/504.02 |
| 7,047,808 B2 * | 5/2006 | Malvern | ............. | G01P 15/0802 73/514.12 |
| 8,528,403 B2 * | 9/2013 | Zunft | ..................... | G01C 19/56 73/504.12 |
| 9,214,896 B2 * | 12/2015 | Heimel | ............. | G01C 19/5776 |
| 2006/0150745 A1 * | 7/2006 | Lang | .................. | G01C 19/5712 73/849 |
| 2006/0191338 A1 * | 8/2006 | Willig | ............... | G01C 19/5755 73/504.12 |

* cited by examiner

*Primary Examiner* — Chun Cao
(74) *Attorney, Agent, or Firm* — Norton Rose Fulbright US LLP; Gerard Messina

(57) ABSTRACT

A method for operating a rotation rate sensor is provided, the rotation rate sensor including a seismic mass, in a first operating step a drive signal and a test signal being provided, in a second operating step a modulation signal being generated by modulating the drive signal with the test signal, in a third operating step the seismic mass being driven to carry out a drive movement as a function of the modulation signal, a detection signal being detected as a function of a step a demodulation signal being provided, a sensor signal being generated by demodulating the detection signal with the demodulation signal, in the fourth operating step a demodulation phase of the demodulation signal being adapted in such a way that a rotation rate offset of the detection signal is compensated for.

15 Claims, 2 Drawing Sheets

METHOD FOR OPERATING A ROTATION RATE SENSOR

RELATED APPLICATION INFORMATION

The present application claims priority to and the benefit of German patent application no. 10 2013 225 359.1, which was filed in Germany on Dec. 10, 2013, the disclosure of which is incorporated herein by reference.

FIELD OF THE INVENTION

The present invention is directed to a method for operating a rotation rate sensor.

BACKGROUND INFORMATION

Such methods are believed to be understood generally. It is also believed to be understood that changes of the demodulation phase may result in a rotation rate offset. However, a correction of the demodulation phase is typically carried out without consideration of parts-individual effects.

SUMMARY OF THE INVENTION

It is an object of the present invention to provide a method for operating a rotation rate sensor which allows an improvement in the correction of the demodulation phase as compared to the related art.

The method according to the present invention for operating a rotation rate sensor as recited in the other independent claims has the advantage over the related art that the adaptation of the demodulation phase of the demodulation signals takes place in such a way that a rotation rate offset of the detection signal is continuously compensated for—i.e., in particular during the operation of the rotation rate sensor. In this way, a change of the demodulation phase may be advantageously compensated for, which otherwise would result in a deviation of the rotation rate signal or rotation rate offset—caused in particular by imperfections of the rotation rate sensor. This is in particular the case with a rotation rate sensor in which the drive circuit is an open loop circuit (open loop system). Advantageously, this also compensates for changes of the demodulation phase which are caused by a temperature dependence of the phase of the detection movement or by higher modes, for example. As compared to the related art, the method according to the present invention in particular has the advantage that parts-individual effects are taken into consideration.

For example, the phase response may be additionally stabilized by increasing the quality of a detection oscillation—which is related to the detection movement—and/or by providing comparison tables for the rotation rate sensor, the comparison tables being provided in particular to compensate for a phase transition—for example as a function of a temperature—and the comparison table being stored in an integrated circuit (ASIC) of the rotation rate sensor. However, such an additional correction alone—i.e., without continuous determination of the phase shift between the drive movement and the detection movement for correcting the demodulation phase—would neglect parts-individual effects.

The method according to the present invention thus advantageously allows a continuous determination of the phase shift between the drive movement and the detection movement for correcting the demodulation phase. For this purpose in particular a test signal is used, which is fed into the drive circuit of the rotation rate sensor and which is detected at the output of the rotation rate channel by use of a digital correlator and serves as a measure for the correction of the demodulation phase. In this way, a parts-individual correction, and thus a comparatively good reduction of the rotation rate offset, are achieved for rotation rate sensors having an open loop system.

Advantageous embodiments and refinements of the present invention may be found in the subclaims as well as in the description with reference to the drawings.

According to one refinement, it is provided that in the fourth operating step the demodulation phase of the demodulation signal is adapted as a function of a correction signal generated by correlating the test signal with the detection signal.

According to one further refinement, it is provided that the compensated rotation rate offset is between 0°/s and 40°/s, which may be between 1°/s and 20°/s, particularly approximately 10°/s.

In this way, it is advantageously possible in a particularly efficient manner to also compensate for a temporally changing rotation rate offset, which occurs under typical ambient conditions during operation.

According to one further refinement, it is provided that the demodulation phase of the demodulation signal is adapted in such a way that a phase shift between the drive movement and the detection movement is continuously compensated for.

In this way, it is advantageously possible to enable a parts-individual correction, and thus a significant reduction of the rotation rate offset during the operation of the rotation rate sensor.

According to one further refinement, it is provided that a digital correlator of the rotation rate sensor is used to generate the correction signal.

In this way, it is advantageously possible to enable the reduction of the rotation rate offset during the operation of the rotation rate sensor in a particularly efficient manner.

According to one further refinement, it is provided that an amplitude of the drive signal is controlled in a control loop, the control loop being in particular an open loop system.

In this way, it is advantageously possible to enable a parts-individual correction, and thus a significant reduction of the rotation rate offset in a rotation rate sensor having an open loop system.

According to one further refinement, it is provided that the test signal is configured in such a way that the test signal primarily includes partial signals which are proportional to a quadrature deflection of the seismic mass.

In this way, it is advantageously possible to compensate for rotation rate offsets created by a phase transition in a particularly efficient manner.

According to one further refinement, it is provided that the test signal is a narrowband test signal or a broadband test signal, the broadband test signal in particular having pseudo-noise.

In this way, it is advantageously possible to compensate for phase transitions even during processes which take place comparatively slowly—such as temperature changes or actions of stress, for example—or to optimize the correction of the rotation rate offset for these cases. For example, tones are used as narrowband test signals, tones being sinusoidal signals or other periodic signals, for example. The fed tones have a frequency close to the drive frequency—i.e., the frequency of the fed tones may differ from the drive frequency by 500 Hz, particularly by 100 Hz, exceptionally by 10 Hz. The drive frequency is in particular defined as the resonant frequency of the mechanical structure in the drive circuit. A broadband signal in particular has a larger bandwidth than the narrowband signal.

A further object of the present invention is a rotation rate sensor including a substrate, a seismic mass deflectable relative to the substrate, a drive device and a detection device, the seismic mass being drivable by the drive device to carry out a drive movement, the detection device being configured to detect a detection movement of the seismic mass, the rotation rate sensor being configured to carry out the method according to the present invention.

In this way, it is advantageously possible to provide a rotation rate sensor in which a continuous determination of the phase shift between the drive movement and the detection movement for correcting the demodulation phase is achieved.

According to one refinement of the rotation rate sensor according to the present invention, it is provided that the rotation rate sensor includes a correlator, in particular a digital correlator, the rotation rate sensor being configured in such a way that a phase shift between the drive movement and the detection movement may be continuously compensated for with the aid of a correction signal of the correlator.

In this way, it is advantageously possible that a parts-individual correction, and thus a comparatively good reduction of the rotation rate offset, also takes place during operation.

Exemplary embodiments of the present invention are shown in the drawings and are described in greater detail in the following description.

DETAILED DESCRIPTION

Figure 1:
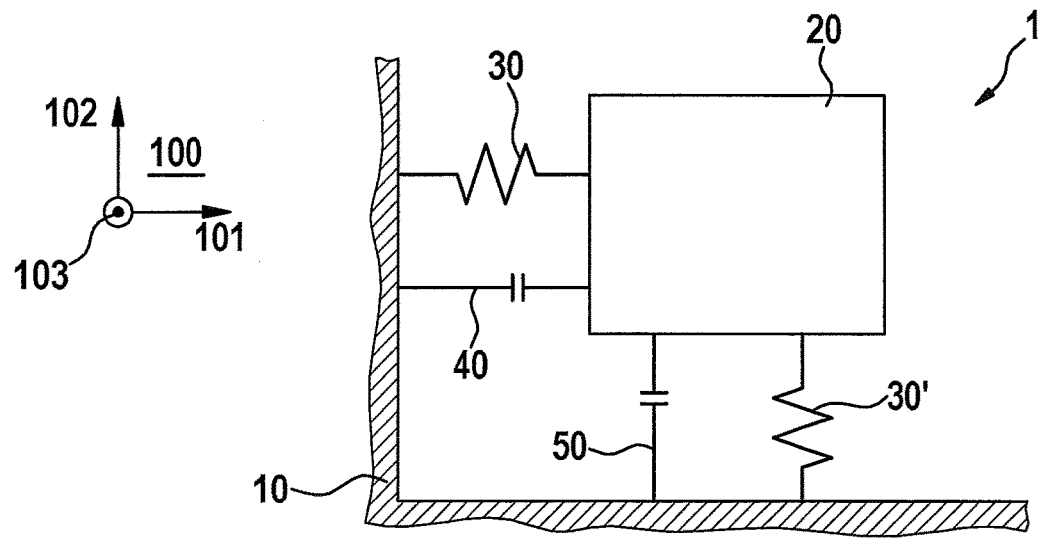
FIG. 1 shows a rotation rate sensor according to one specific embodiment of the present invention.

Identical parts are always denoted by the same reference numerals in the various figures and are therefore generally also cited or mentioned only once.

FIG. 1 shows a rotation rate sensor according to one exemplary specific embodiment of the present invention. Rotation rate sensor 1 includes a substrate 10 having a main extension plane 100 and a seismic mass 20, which is connected to substrate 10 in particular via a first spring structure 30 and a second spring structure 30'. The seismic mass here is deflectable relative to substrate 10 in particular along a first direction 101 (X direction) which is parallel to main extension plane 100 and along a second direction 102 (Y direction) which is parallel to main extension plane 100. Rotation rate sensor 1 moreover includes a drive device 40, which is configured to generate a drive movement of seismic mass 20, the drive movement taking place in particular along X direction 101.

If rotation rate sensor 1 is acted on by a rotation rate about a third direction 103 (Z direction) which is perpendicular to main extension plane 100 of substrate 10, seismic mass 20 in the specific embodiment shown here is deflected along Y direction 102 due to a Coriolis acceleration. This causes in particular a detection movement of seismic mass 20 along Y direction 102. Rotation rate sensor 1 furthermore includes a detection device 50, which is configured to detect a detection movement of seismic mass 20.

A deflection of seismic mass 20 along Y direction 103, in particular due to manufacturing imperfections, may take place even when rotation rate sensor 1 is situated in an inertial system, rotation rate sensor 1 not being acted on by a rotation rate about Z direction 103. Such a deflection is referred to here as a quadrature deflection.

Figure 2:
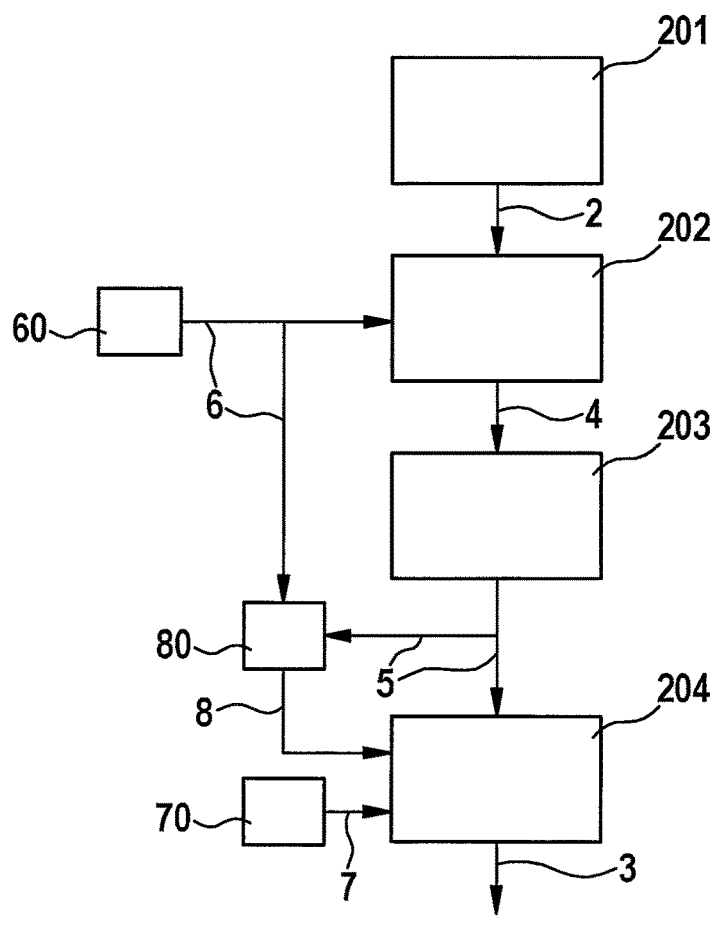
FIG. 2 shows a schematic illustration of a method according to one specific embodiment of the present invention.

FIG. 2 shows a schematic illustration of a method according to one specific embodiment of the present invention, according to which rotation rate sensor 1 is operated.

In a first operating step (reference numeral 201), a drive signal 2 is provided which is generated by a signal generator (not shown) of rotation rate sensor 1, for example. Furthermore a test signal 6 is provided, the rotation rate sensor in particular including a test signal generator 60 which generates test signal 6.

In a second operating step, a modulation signal 4 is generated by modulating drive signal 2 with test signal 6, modulation signal 4 essentially corresponding to drive signal 2 which is modulated with test signal 6.

In a third operating step, seismic mass 20 is driven to carry out a drive movement as a function of modulation signal 4, this taking place in particular by applying modulation signal 4 to drive device 40. Detection signal 5 is detected as a function of the detection movement of seismic mass 20—and thus also as a function of modulation signal 4.

A demodulation signal 7 is provided in a fourth operating step, rotation rate sensor 1 in particular including a demodulation signal generator 70 which is configured to generate demodulation signal 7.

Demodulation signal 7 is generated in particular as a function of test signal 6. Demodulation signal 7 is in particular at the same frequency as and/or in-phase with test signal 6. Demodulation signal 7 in particular has a constant amplitude. In one alternative specific embodiment, test signal generator 60 and demodulation signal generator 70 form a unit. Subsequently, a sensor signal 3 is generated by demodulating detection signal 5 as a function of demodulation signal 7.

In the fourth operating step, a demodulation phase of demodulation signal 7 is in particular adapted in such a way that a rotation rate offset of detection signal 5 is compensated for. Compensation of the rotation rate offset of detection signal 5 within the scope of the present invention means that the rotation rate offset is effectively compensated for—i.e., the adaptation of the demodulation signal has the effect of a compensation. Compensation of the rotation rate offset according to the present invention particularly may mean that the rotation rate offset is demodulated into the quadrature channel. Rotation rate sensor 1 in particular includes a correlator 80, which may be a digital correlator, which is configured in such a way that a correction signal 8 for correcting a rotation rate offset is generated as a function of a correlation of test signal 6 with detection signal 5. Rotation rate offset here means in particular an offset which is detected when rotation rate sensor 1 is situated in an inertial system. The correction of the rotation rate offset takes place in particular by adapting the demodulation phase of demodulation signal 7 as a function of a phase shift between the drive movement and the detection movement.

Figure 3:
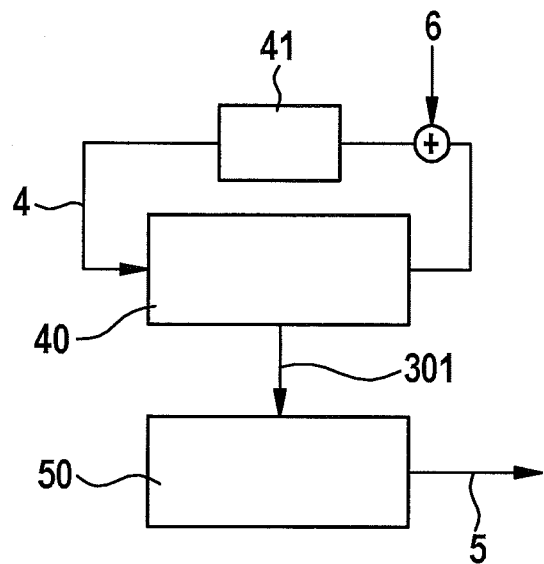
FIG. 3 shows another schematic illustration of a method according to one specific embodiment of the present invention.

FIG. 3 shows a schematic illustration of a method according to one specific embodiment of the present invention. Here, test signal 6 is fed into the amplitude controller of the drive circuit, drive signal 4 being controlled in particular with the aid of a control element 41 of drive device 40. Control element 41 is in particular a proportional-integral controller (PI controller). The drive circuit is in particular a closed-loop system. The detection circuit is in particular an open loop system. By feeding test signal 6 into the amplitude controller of the drive circuit, the drive movement or drive deflection of seismic mass 20 is modulated with test signal 6 and—in particular due to the comparatively fixed coupling between quadrature deflection and drive deflection—is also transmitted to the quadrature deflection (see arrow 301 in FIG. 3). In particular in the case that rotation rate sensor 1 has a demodulation fault, a rotation rate offset (zero-rate offset, ZRO) is generated or detection signal 5 includes a partial signal referred to as a quadrature component. This means in particular that the quadrature is mixed into the rotation rate channel of rotation rate sensor 1 and results in the rotation rate offset (ZRO). With the aid of test signal 6, which may be the quadrature component in the rotation rate channel is determined and the demodulation phase of demodulation signal 7 is accordingly adapted, so that in particular the rotation rate offset is compensated for. For example, the detection of test signal 6 in the rotation rate channel—i.e., in detection signal 5—takes place by correlator 80 of rotation rate sensor 1.

Figure 4:
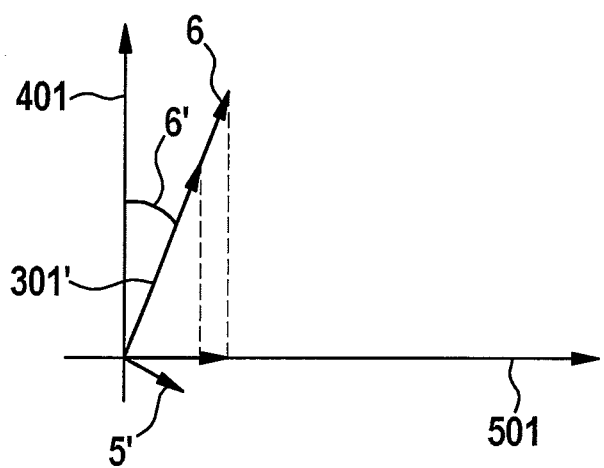
FIG. 4 shows a phasor diagram of an exemplary test signal.

FIG. 4 shows a phasor diagram of an exemplary test signal 6. Here, the I channel of rotation rate sensor 1 is shown on horizontal axis 501, and the Q channel of rotation rate sensor 1 is shown on vertical axis 401. Test signal 6 has a phase angle $\phi_{corr}$ (reference numeral 6') relative to Q channel 401. FIG. 4 furthermore shows quadrature signal 301' and rotation rate offset 5'.

What is claimed is:

1. A method for operating a rotation rate sensor, which includes a seismic mass, a drive device to drive the seismic mass along a first direction, and a detection device to detect movement of the seismic mass along a second direction perpendicular to the first direction in response to a rotation rate applied to the rotation rate sensor about an axis perpendicular to the first and second directions, the method comprising:
   providing a drive signal and a test signal;
   generating a modulation signal by modulating the drive signal with the test signal;
   driving the seismic mass using the drive device to carry out a drive movement along the first direction as a function of the modulation signal;
   detecting, using the detection device, a detection signal as a function of a detection movement of the seismic mass along the second direction perpendicular to the first direction; and
   providing a demodulation signal, a sensor signal being generated by demodulating the detection signal with the demodulation signal, wherein a demodulation phase of the demodulation signal is adapted so that a rotation rate offset of the detection signal is continuously compensated for.

2. The method of claim 1, wherein the demodulation phase of the demodulation signal is adapted as a function of a correction signal generated by correlating the test signal with the detection signal.

3. The method of claim 1, wherein the compensated rotation rate offset is between 0°/s and 40°/s.

4. The method of claim 1, wherein the demodulation phase of the demodulation signal is adapted so that a phase shift between the drive movement and the detection movement is continuously compensated for.

5. The method of claim 1, wherein a digital correlator of the rotation rate sensor is used to generate the correction signal.

6. The method of claim 1, wherein an amplitude of the drive signal is controlled in a control loop.

7. The method of claim 1, wherein the test signal is configured so that the test signal primarily includes partial signals which are proportional to a quadrature deflection of the seismic mass.

8. The method of claim 1, wherein the test signal is a narrowband test signal or a broadband test signal.

9. A rotation rate sensor, comprising:
   a substrate;
   a seismic mass deflectable relative to the substrate;
   a drive device to drive the seismic mass along a first direction; and
   a detection device to detect movement of the seismic mass along a second direction perpendicular to the first direction in response to a rotation rate applied to the rotation rate sensor about an axis perpendicular to the first and second directions;
   wherein the rotation rate sensor is configured for operating as follows:
      providing a drive signal and a test signal;
      generating a modulation signal by modulating the drive signal with the test signal;
      driving the seismic mass using the drive device to carry out a drive movement along the first direction as a function of the modulation signal;
      detecting, using the detection device, a detection signal as a function of a detection movement of the seismic mass along the second direction perpendicular to the first direction; and
      providing a demodulation signal, a sensor signal being generated by demodulating the detection signal with the demodulation signal, wherein a demodulation phase of the demodulation signal is adapted so that a rotation rate offset of the detection signal is continuously compensated for.

10. The rotation rate sensor of claim 9, wherein the rotation rate sensor includes a correlator, the rotation rate sensor being configured so that a phase shift between the drive movement and the detection movement is continuously compensate-able with the aid of a correction signal of the correlator.

11. The rotation rate sensor of claim 9, wherein the rotation rate sensor includes a digital correlator, the rotation rate sensor being configured so that a phase shift between the drive movement and the detection movement is continuously compensate-able with the aid of a correction signal of the correlator.

12. The method of claim 1, wherein the compensated rotation rate offset is between 1°/s and 20°/s.

13. The method of claim 1, wherein the compensated rotation rate offset is between 0°/s and 40°/s.

14. The method of claim 1, wherein an amplitude of the drive signal is controlled in a control loop, which is an open loop system.

15. The method of claim 1, wherein the test signal is a narrowband test signal or a broadband test signal, the broadband test signal having pseudo-noise.

* * * * *